(12) United States Patent
Huffman et al.

(10) Patent No.: US 10,641,302 B1
(45) Date of Patent: May 5, 2020

(54) POLE ASSEMBLY WITH DOVETAIL CAM STRUCTURE FOR ACCESSORY MOUNTING

(71) Applicant: Kearney-National Inc., New York, NY (US)

(72) Inventors: Charles R. Huffman, Kingsport, TN (US); Paul M. Gaskins, Bristol, TN (US); Gregory D. Mercier, Bristol, TN (US)

(73) Assignee: KEARNEY-NATIONAL INC., New York, NY (US)

( * ) Notice: Subject to any disclaimer, the term of this patent is extended or adjusted under 35 U.S.C. 154(b) by 0 days.

(21) Appl. No.: 16/378,997

(22) Filed: Apr. 9, 2019

(51) Int. Cl.
*F16B 2/18* (2006.01)
*F16M 13/02* (2006.01)

(52) U.S. Cl.
CPC ............. *F16B 2/18* (2013.01); *F16M 13/022* (2013.01)

(58) Field of Classification Search
CPC ......... E04H 12/02; E04H 12/08; E04H 12/24; E04B 2001/2403; E04B 2001/2424; E04B 2001/2439; E04B 2001/2415; E04C 3/32; A47B 57/54; A47B 57/56; A47B 96/1416; F16B 2200/30
USPC .......................................... 52/651.01, 651.02
See application file for complete search history.

(56) References Cited

U.S. PATENT DOCUMENTS

| | | | | |
|---|---|---|---|---|
| 1,034,365 A * | 7/1912 | Hauser | ............... | A47B 57/56 248/246 |
| 4,194,338 A * | 3/1980 | Trafton | ............... | E04C 3/32 256/65.03 |
| 4,941,763 A * | 7/1990 | Euteneuer | ............... | A63B 9/00 403/3 |
| 4,995,176 A * | 2/1991 | Briscoe | ............... | E02F 3/8152 37/454 |
| 5,175,971 A * | 1/1993 | McCombs | ............... | E04H 12/02 52/843 |
| 5,899,423 A * | 5/1999 | Albertini | ............... | A47B 13/02 248/188.8 |
| 5,941,399 A * | 8/1999 | Wang | ............... | F16B 12/32 211/187 |
| 5,979,119 A * | 11/1999 | Trafton | ............... | E04B 1/2403 52/40 |
| 6,220,464 B1 * | 4/2001 | Battaglia | ............... | A47B 57/54 108/107 |

(Continued)

FOREIGN PATENT DOCUMENTS

EP 0750869 A1 * 1/1997 ............. A47B 57/56

*Primary Examiner* — Christine T Cajilig
(74) *Attorney, Agent, or Firm* — Buchanan Ingersoll & Rooney PC (57) ABSTRACT

A pole assembly includes an elongated tubular member having an outer periphery with a pair of grooves therein, each groove defining a concave sidewall portion and a flat sidewall portion, a cam member comprising a plate-shaped portion and a pair of arms extending from a surface of the plate-shaped portion, the cam member configured to, while the major surface is adjacent a portion of the outer periphery, be rotated to cause each arm of the pair of arms to engage a respective groove of the pair of grooves, and a mount portion comprising a body defining a cavity having a pair of elongated sidewalls configured to engage respective outer surfaces of the pair of arms while the mount portion covers the cam member and the cam member is at least partially within the cavity to prevent the pair of arms from disengaging from the pair of grooves.

18 Claims, 11 Drawing Sheets

(56) References Cited

U.S. PATENT DOCUMENTS

| | | | |
|---|---|---|---|
| 7,178,765 B2 | 2/2007 | Huang | |
| 7,530,540 B2 * | 5/2009 | Long | E04B 2/744 |
| | | | 248/230.1 |
| 9,347,213 B1 | 5/2016 | Zhang et al. | |
| 9,453,592 B2 | 9/2016 | Zhang et al. | |
| 9,683,590 B2 | 6/2017 | Zhang et al. | |
| 9,746,105 B2 | 8/2017 | Zhang et al. | |
| 9,790,980 B2 | 10/2017 | Mccarthy et al. | |
| 2006/0092646 A1 * | 5/2006 | Kelly | E04H 12/08 |
| | | | 362/431 |

* cited by examiner

POLE ASSEMBLY WITH DOVETAIL CAM STRUCTURE FOR ACCESSORY MOUNTING

TECHNICAL FIELD

The present disclosure relates to a pole assembly with a dovetail cam structure for accessory mounting.

BACKGROUND

Utility poles, lighting poles, and other types of poles have become ubiquitous in developed regions of the world. In recent years, there has been an increase in the number and type of accessories, including cellular and wi-fi transmitters and receivers, closed-circuit cameras, various sensors, etc., which can be particularly useful when mounted to such poles. Preferably, any wiring for such accessories is hidden within the pole for security and aesthetics. However, it can be difficult to add, remove, swap, and/or reposition such accessories on the pole in an efficient manner while keeping the desired security and aesthetics and/or without permanently altering the pole itself.

SUMMARY

The present disclosure provides a description of a pole assembly including an elongated tubular member having a longitudinal central axis and an outer periphery with a pair of grooves therein, each groove extending along the central axis and defining a concave sidewall portion and a substantially flat sidewall portion, a cam member comprising a plate-shaped portion and a pair of arms extending from a major surface of the plate-shaped portion, the cam member configured to, while the major surface is adjacent a portion of the outer periphery between the pair of grooves, be rotated to cause each arm of the pair of arms to engage a respective groove of the pair of grooves, and a mount portion comprising a body defining a cavity having a pair of elongated sidewalls configured to engage respective outer surfaces of the pair of arms while the mount portion covers the cam member and the cam member is at least partially within the cavity to prevent the pair of arms from disengaging from the pair of grooves.

The present disclosure also provides a description of a pole assembly including an elongated tubular member having a longitudinal central axis and an outer periphery with a pair of grooves therein, each groove extending along the central axis and defining a concave sidewall portion and a substantially flat sidewall portion, a pair of cam members, each cam member comprising a plate-shaped portion and an arm extending along a first side of a major surface of the plate-shaped portion, each cam member configured to be engaged by its arm with a respective groove of the pair of grooves, and a mount portion comprising a body defining a concavity and a pair of mounting flanges extending from opposite ends of the concavity, each mounting flange configured to be attached to a respective cam member of the pair of cam members at a second side of the cam member opposite the first side.

DETAILED DESCRIPTION

The components and devices described herein are in relation to a pole assembly. However, the components and devices are not necessarily limited to being used on a lighting or utility pole. The inventive pole assembly may be used in any appropriate context as one of ordinary skill in the art would recognize.

Figure 1:
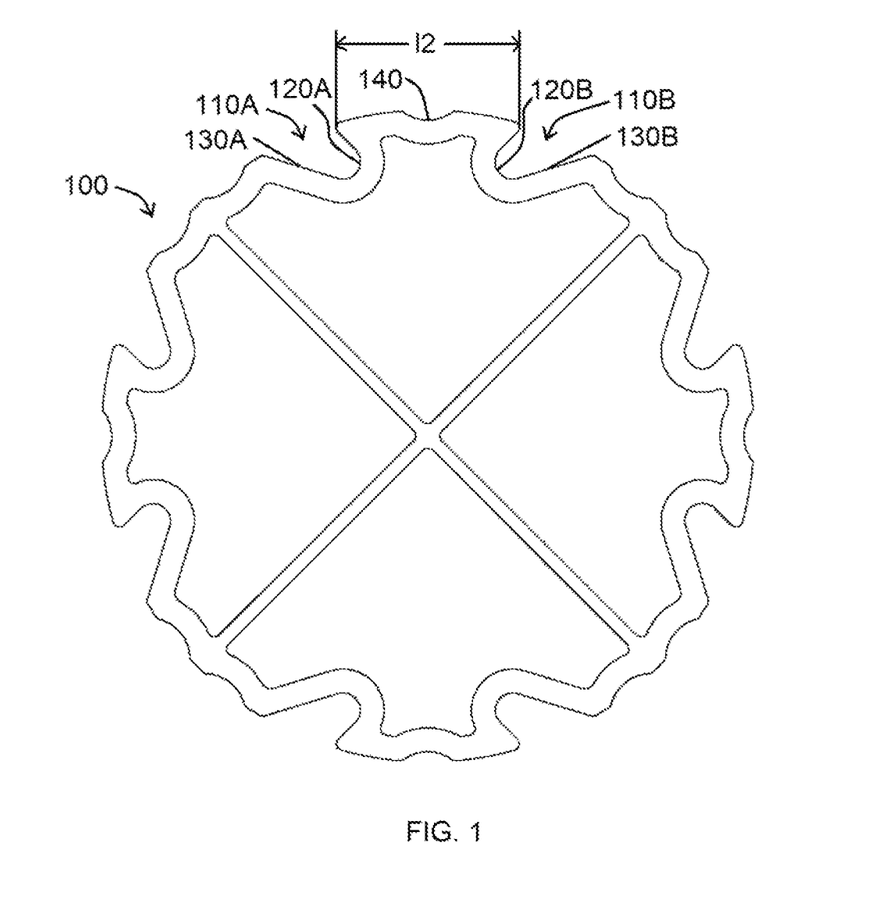
FIG. 1 illustrates a cross-sectional view of a tubular member of an embodiment of a pole assembly.
Figure 2:
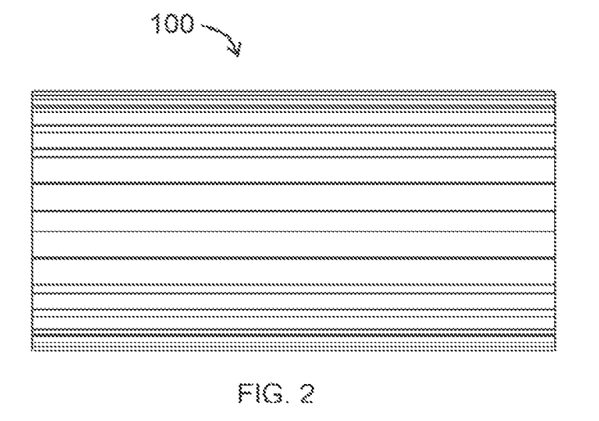
FIG. 2 illustrates a side view of a portion of a tubular member of an embodiment of a pole assembly.
Figure 3:
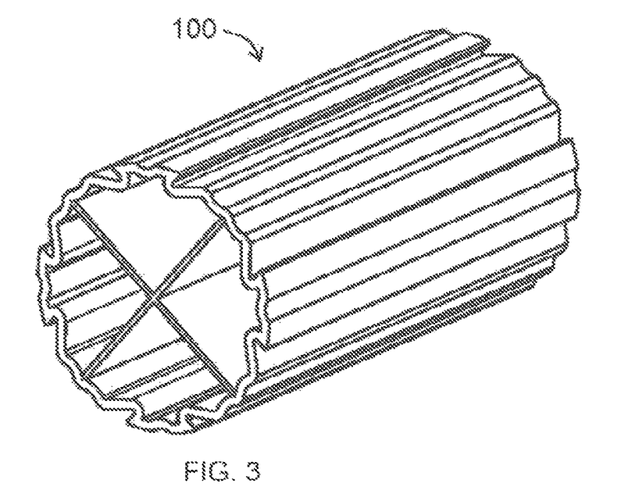
FIG. 3 illustrates a perspective view of a portion of a tubular member of an embodiment of a pole assembly.

FIG. 1 illustrates a cross-sectional view of a tubular member 100 of a pole assembly according to embodiments of the present application, while FIGS. 2 and 3 illustrate side and perspective views of at least a portion of the tubular member 100, which is elongated along a longitudinal central axis. In embodiments in which the pole assembly is a light pole assembly, the tubular member 100 would be essentially the portion of the light pole which is elongated and has a substantially uniform cross-section, i.e., the majority of the longitudinal extent of the light pole. Furthermore, the tubular member 100 can be joined, for example, to a base at one end, and to a lamp at the other end.

In some embodiments, the tubular member 100 could be a single member, and in other embodiments, two or more members joined together. The tubular member 100 is illustrated as divided by internal walls into four internally-separated longitudinal (i.e., axially-extending) chambers. These chambers can be for physical and electrical isolation of different electrical lines. For example, low voltage lines can be EMI shielded from high power lines by running them in separate longitudinal chambers. In alternate embodiments there are can be more or fewer internally-separated longitudinal chambers, or in a single longitudinal chamber.

The outer periphery of the tubular member 100 includes at least one pair of grooves 110A and 110B therein, each groove extending along the central axis and defining a respective concave sidewall portion 120A and 120B and substantially flat sidewall portion 130A and 130B. In the illustrated embodiments, there are four such pairs of grooves 110A and 110B. The portions of the outer periphery of the tubular member 100 between the various grooves can be provided, for example, with decorative fluting 140 in the central area.

Figure 4:
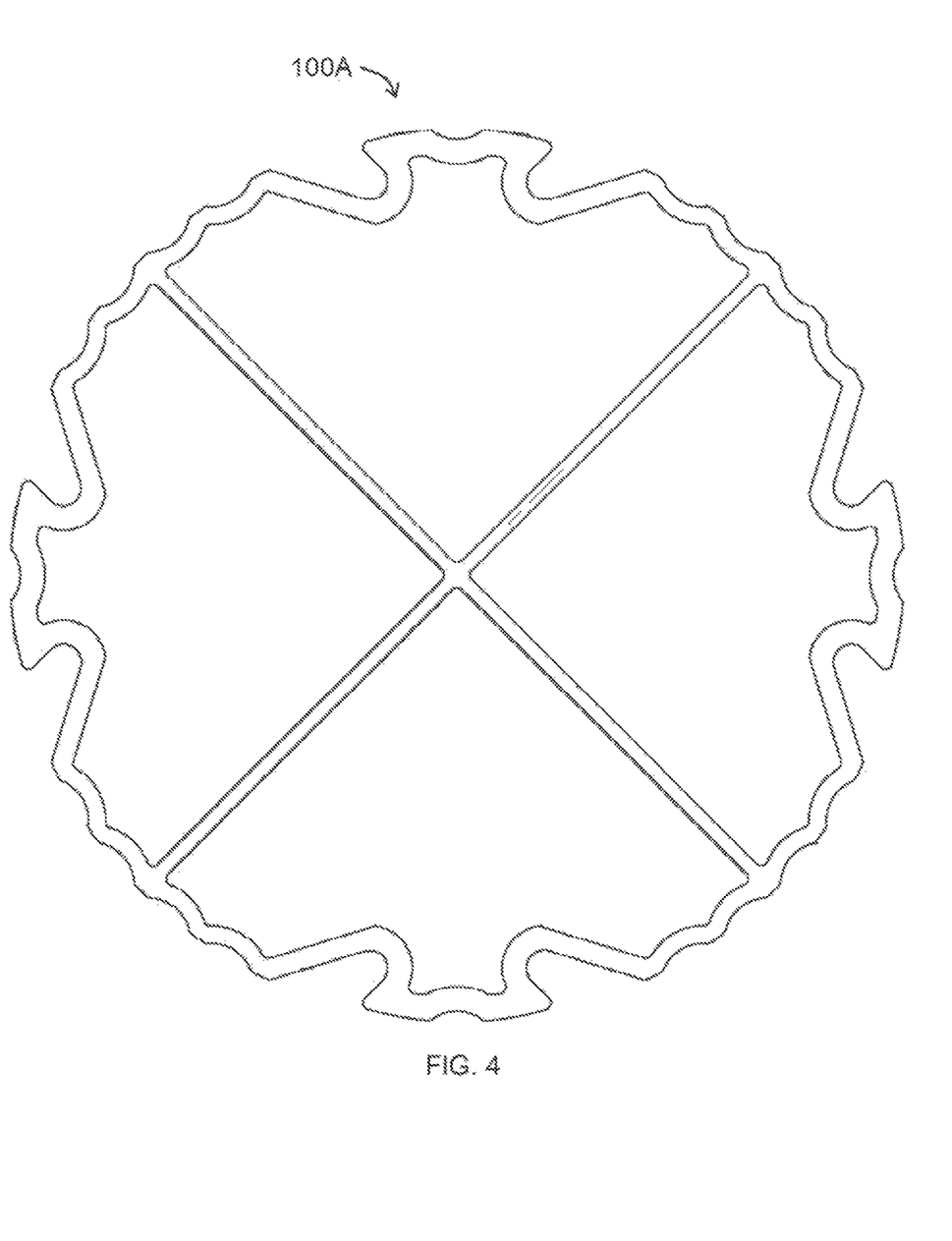
FIG. 4 illustrates a cross-sectional view of a larger tubular member of an embodiment of a pole assembly.
Figure 5:
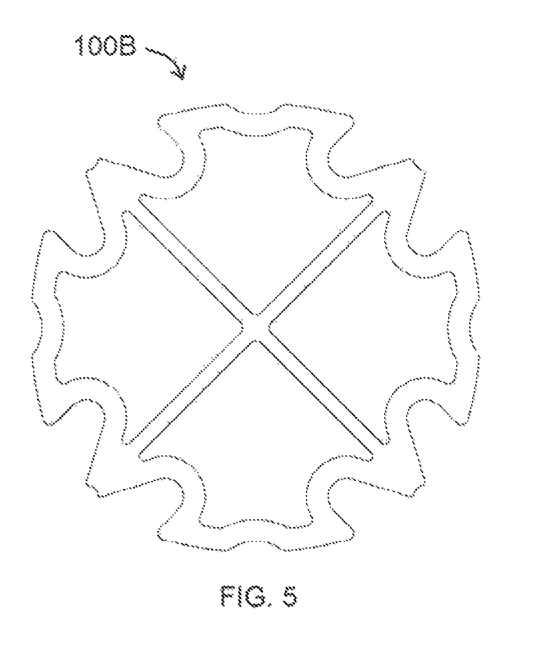
FIG. 5 illustrates a cross-sectional view of a smaller tubular member of an embodiment of a pole assembly.

The diameter of the tubular member 100 is not particularly limiting. However, for interchangeable use with other components of the pole assembly discussed in detail below, the geometry and spacing of the pairs of grooves 110A and 110B should be kept substantially the same. FIG. 4 illustrates an example of a cross-section of a larger-diameter tubular member 100A, and a FIG. 5 illustrates an example of a cross-section of a smaller-diameter tubular member 100B, with similar pairs of grooves provided. Each pair of grooves define a dovetail structure. By providing for a plurality of elongated tubular members having different outermost diameters, but with the same dovetail structure geometry, the same mounting hardware can be used for installations of different sizes, allowing for efficiencies in, for example, inventory and manufacturing scale afforded by a reduced number of different parts required to be made available, compared to a system in which poles of different diameters require different mounting hardware.

Figure 6:
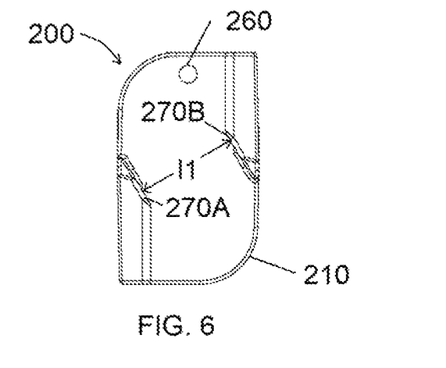
FIG. 6 illustrates a front view of a cam member of an embodiment of a pole assembly.
Figure 7:
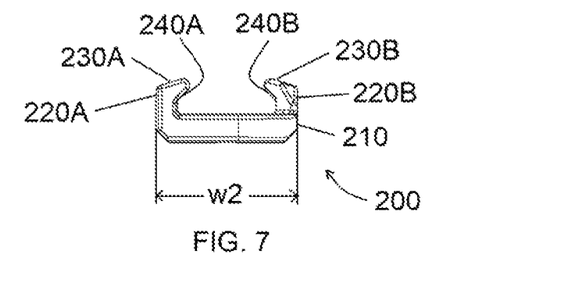
FIG. 7 illustrates a top view of a cam member of an embodiment of a pole assembly.
Figure 8:
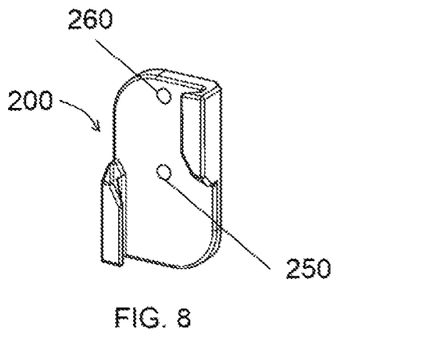
FIG. 8 illustrates a perspective view of a cam member of an embodiment of a pole assembly.

A second component of a pole assembly according to embodiments of the present disclosure is cam member 200, as illustrated in FIGS. 6-8. The cam member 200 includes a plate-shaped portion 210 and a pair of arms 220A and 220B extending from a major surface of the plate-shaped portion 210. In the embodiment, the plate-shaped portion 210 is roughly rectangular-shaped, with the first arm 220A extending approximately along a top half of one of the long sides of the rectangle, and the second arm 220B extending approximately along a bottom half of the other of the long sides of the rectangle. As illustrated in FIGS. 6-8, each of the arms 220A and 220B defines a respective longitudinal slot 240A and 240B which faces the opposing long side. As discussed in detail below, the respective longitudinal slots 240A and 240B have a shape which correspond to the concave sidewall portions 120A and 120B of the grooves 110A and 110B of the tubular member 100. Furthermore, each arm 220A and 220B extends along approximately one half of the respective long sides of the rectangle, from the upper side to the center portion, and from the lower side to the center portion, respectively.

Each of the pair of arms 220A and 220B also defines a respective substantially flat outer surface 230A and 230B. As discussed in detail below, the substantially flat outer surfaces 230A and 230B define an obtuse angle which is substantially the same as an obtuse angle defined by the substantially flat sidewall portions 130A and 130B of the grooves 110A and 110B of the tubular member 100. Additionally, each of the pair of arms 220A and 220B defines a chamfered surface 270A and 270B chamfered at an acute angle relative to the longitudinal axis, and having a perpendicular distance 11, as illustrated in FIG. 6, between the chamfered surfaces 270A and 270B slightly greater than a distance 12, as illustrated in FIG. 1, between the respective intersections of the pair of grooves 110A and 110B with the portion of the outer periphery of the tubular member 100 between the pair of grooves 110A and 110B. Furthermore, a pair of longitudinally centrally-aligned threaded holes 250 and 260 are provided in the plate-shaped portion 210.

Figure 9:
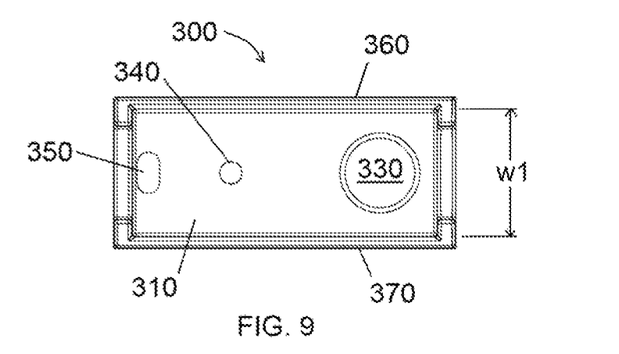
FIG. 9 illustrates a front view of a mount portion of an embodiment of a pole assembly.
Figure 10:
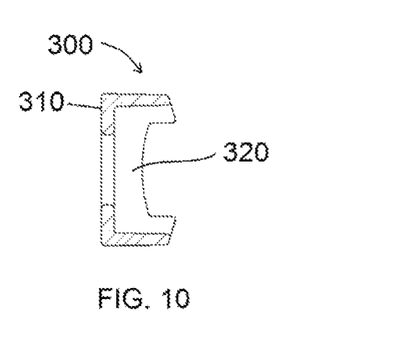
FIG. 10 illustrates a top view of a mount portion of an embodiment of a pole assembly.
Figure 11:
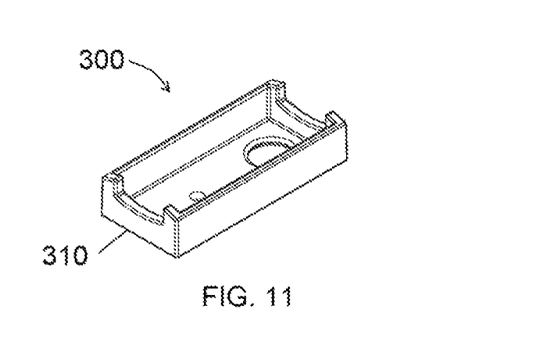
FIG. 11 illustrates a perspective view of a mount portion of an embodiment of a pole assembly.

A third component of a pole assembly according to embodiments of the present disclosure is a mount portion 300, as illustrated in FIGS. 9-11. The mount portion 300 includes a body 310 including a plate-shaped flat portion and sidewalls extending from edges of a surface of the plate-shaped flat portion to define a cavity 320. The sidewalls 360 and 370 define a gap having a width w1 slightly greater than width w2 of the cam member 200. A wire hole 330 and a pair of longitudinally centrally-aligned through-holes 340 and 350 are provided in the plate-shaped flat portion, with a distance between the through-holes substantially the same as the distance between the threaded holes 250 and 260. The mount portion 300 has a length sufficient to cover at least a portion (in the embodiment, all) of the length of the cam member 200.

Figure 12:
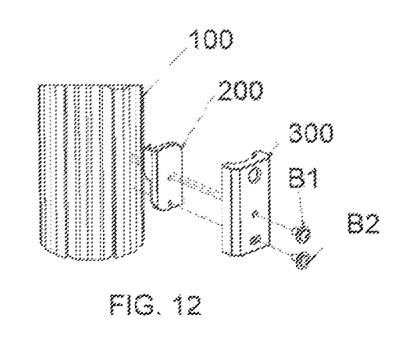
FIG. 12 illustrates a perspective view of a first step of installing a cam member and a mount portion to a tubular member of an embodiment of a pole assembly.
Figure 13:
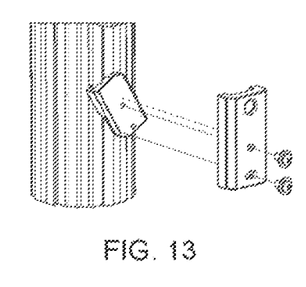
FIG. 13 illustrates a perspective view of a second step of installing a cam member and a mount portion to a tubular member of an embodiment of a pole assembly.
Figure 14:
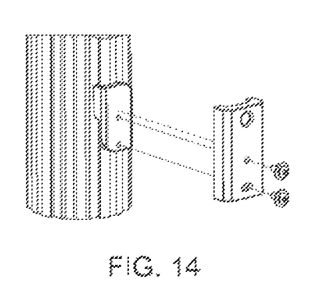
FIG. 14 illustrates a perspective view of a third step of installing a cam member and a mount portion to a tubular member of an embodiment of a pole assembly.

In use, as illustrated in FIGS. 12 and 13, the cam member 200 is first placed such that the major surface from which the arms 220A and 220B extend is adjacent a portion of the outer periphery of the tubular member 100 between the pair of grooves 110A and 110B, and with the cam member 200 rotated relative to the longitudinal axis of the tubular member 100 by angle corresponding to the acute angle defined by the chamfered surfaces 270A and 270B (in the embodiment, counterclockwise). The cam member is then rotated back into alignment (in the embodiment, clockwise) to cause the arms 220A and 220B to be in camming engagement a respective groove 110A and 110B, as illustrated in FIG. 14.

Figure 15:
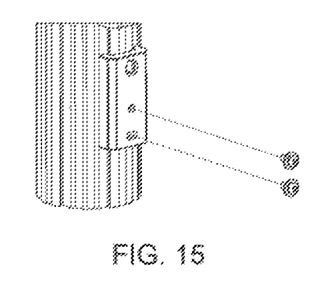
FIG. 15 illustrates a perspective view of a fourth step of installing a cam member and a mount portion to a tubular member of an embodiment of a pole assembly.
Figure 16:
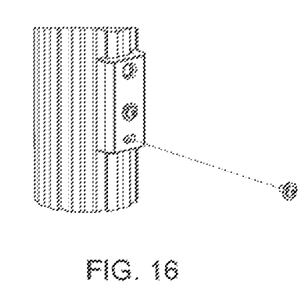
FIG. 16 illustrates a perspective view of a completed installation of a cam member and a mount portion to a tubular member of an embodiment of a pole assembly.
Figure 17:
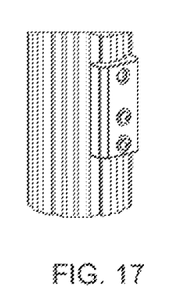
FIG. 17 illustrates a perspective view of a sixth step of installing a cam member and a mount portion to a tubular member of an embodiment of a pole assembly.

Next, as illustrated in FIG. 15, the mount portion 300 is placed over the cam member 200 so that the cam member 200 is at least partially within the cavity 320, such that the sidewalls 360 and 370 can engage the outer surfaces of the arms 220A and 220B of the cam member 200 if relative rotation is attempted. Then, as illustrated in FIGS. 16 and 17, a first bolt B1 is placed through first through hole 340 and threaded into first threaded hole 250, and a second bolt B2 is placed through second through hole 350 and threaded into second threaded hole 260. The bolts B1 and B2 can be sequentially installed and torqued, or the bolts can first both be loosely inserted, so that the cam member 200 and mount portion 300 can be slid along the dovetail to the desired longitudinal position, and then the bolts tightened to fix the longitudinal position. By loosely installing both bolts through the mount portion 300 and cam member 200, the cam member 200 is kept from disengaging from or rotating relative to the dovetail feature of the tubular member 100, but is not fixed longitudinally.

Figure 18:
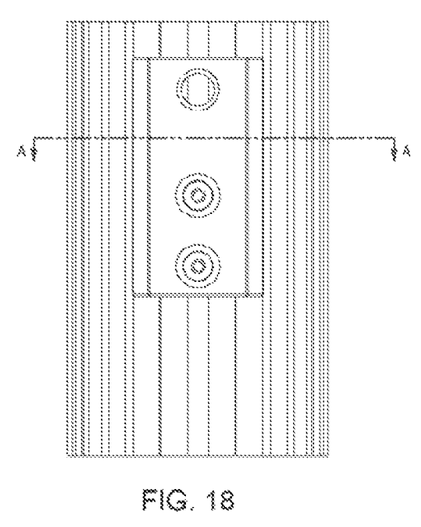
FIG. 18 illustrates a side view of a cam member and a mount portion installed to a tubular member of an embodiment of a pole assembly.
Figure 19:
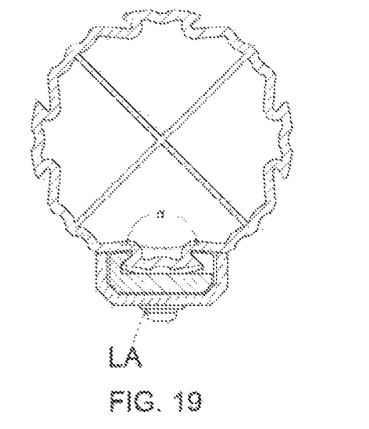
FIG. 19 illustrates a cutaway view of a cam member and a mount portion installed to a tubular member of an embodiment of a pole assembly.

FIGS. 18 and 19 illustrate the assembly fixed in position. The matching obtuse angle α between both the substantially flat outer surfaces 230A and 230B of the arms 220A and 220B and the substantially flat sidewall portions 130A and 130B of the grooves 110A and 110B helps align and center the cam member 200 relative to the tubular member 100. Furthermore, the sidewalls (including longitudinal sidewalls 360 and 370) of the mount portion 300 are provided to have a depth such that, when the bolts are tightened, the end faces of the sidewalls are pushed radially inward against the substantially flat sidewall portions 130A and 130B of the grooves 110A and 110B, and at the same time the arms 220A and 220B are pulled radially outward against the respective grooves 110A and 110B, to fix the mount portion 300 and cam member 200 relative to the tubular portion 100. Furthermore, as illustrated in those figures, the end faces of the longitudinal sidewalls 360 and 370 also define the obtuse angle α, to help align and center the mount portion 300 relative to the tubular member 100.

As also illustrated in FIGS. 18 and 19, the wire hole 330 is positioned so that an accessory, such as a cellular or wi-fi transceiver, closed-circuit camera, or sensor assembly, can be mounted thereto, instead of directly to the pole. If necessary, a small hole can be made in the tubular member 100 for connection of a wire within the tubular member 100 to an accessory mounted to the wire hole 330. The wire hole 330 is positioned such that at least a portion is not radially adjacent to the cam member 200, as illustrated in FIG. 18, for ease of mounting and wiring the accessory. Furthermore, those figures illustrate an example of a locking assembly LA, including a lock washer and a plain washer, that can be used in installing each bolt B1 and B2.

Figure 20:
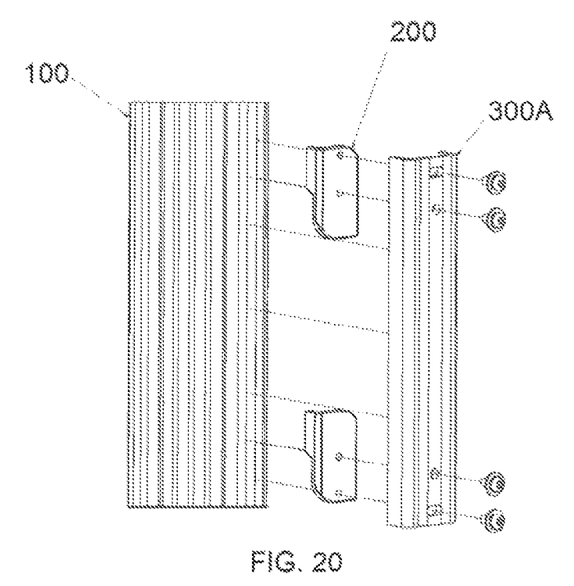
FIG. 20 illustrates an exploded perspective view of two cam members and an extended mount portion installed to a tubular member of a modified embodiment of a pole assembly.

FIG. 20 illustrates a pole assembly embodiment which uses a modified mount portion 300A. The mount portion 300A is similar to the mount portion 300 described above except that it has a significantly longer longitudinal length, and includes two sets of through holes, one set at each end. Additionally, one or more mounting holes may be provided in a central portion. The mount portion 300A is configured for use with the tubular member 100 described above and two of the cam members 200 described above. In use, the cam members 200 are located in the desired longitudinal positions, spaced apart the appropriate amount for use with the mount portion 300A, and then each set of through holes of the mount portion 300A is aligned with the set of threaded holes of one of the cam members 200, and the bolts inserted and tightened as discussed above. With this arrangement, a significantly longer mount portion 300A can be utilized that is firmly fixed in place by the cam members 200 at each end.

Figure 21:
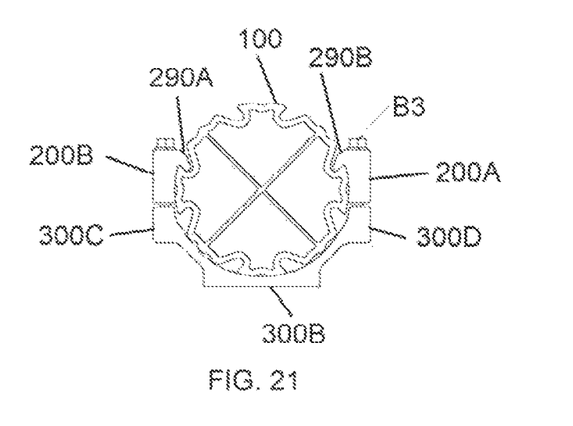
FIG. 21 illustrates a top view of a further embodiment of a pole assembly.
Figure 22:
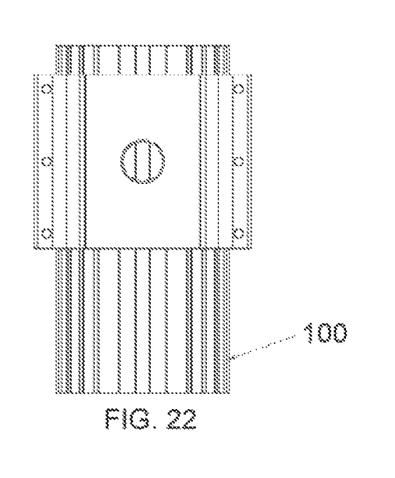
FIG. 22 illustrates a side view of a further embodiment of a pole assembly.
Figure 23:
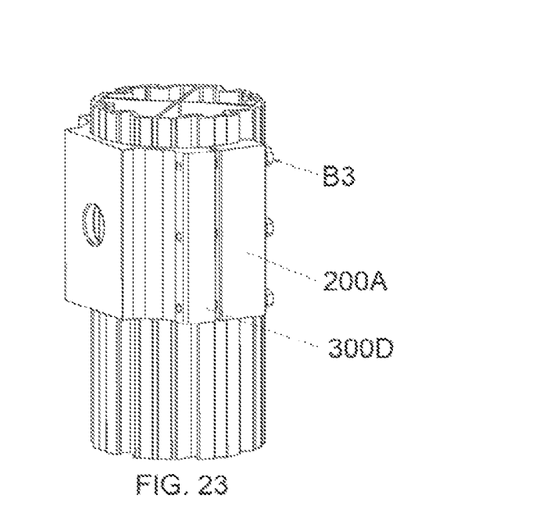
FIG. 23 illustrates a perspective view of a further embodiment of a pole assembly.

FIGS. 21-23 illustrate a further embodiment of a pole assembly according to the present application. The further embodiment can be used with the same tubular member 100 as discussed above. Two cam members 200A and 200B are used in the embodiment. However, unlike the cam member 200 discussed above, the cam members 200A and 200B each have a single slotted arm (290A, and 290B, respectively) extending along substantially all of only one of the longer sides. The cross-sectional shape of the slot is substantially the same as that of the slots in the arms 220A and 220B of the cam member 200. Furthermore, the cam members 200A and 200B have a plurality of (in the embodiment, three) through holes which extend through the widthwise direction of the cam member.

The pole assembly of FIGS. 21-23 also includes a mount portion 300B defining one or more mounting holes and/or wire holes, as well as a concavity in which a portion of the tubular member 100 is to be disposed within, and two opposite mounting flanges 300C and 300D. The mounting flanges 300C and 300D are each configured to be engaged to respective second sides of the cam members 200A and 200B opposite first sides at which the arms 220A and 220B are disposed. Threaded holes in the mounting flanges 300C and 300D correspond to the through holes in the cam members 200A and 200B, and respective bolts B3 are provided to be disposed through a respective through-hole and threaded hole to attach the respective mounting flange and cam member and prevent relative rotation therebetween. Furthermore, when the bolts are tightened, the engagement between the slots of the arms 220A and 220B with the dovetails of the tubular member 100, and of the cavity of the mount portion 300B with the outer periphery of the tubular member 100, fixes the cam members 200A and 200B and the mount portion 300B in a longitudinal position on the tubular member 100.

Figure 24:
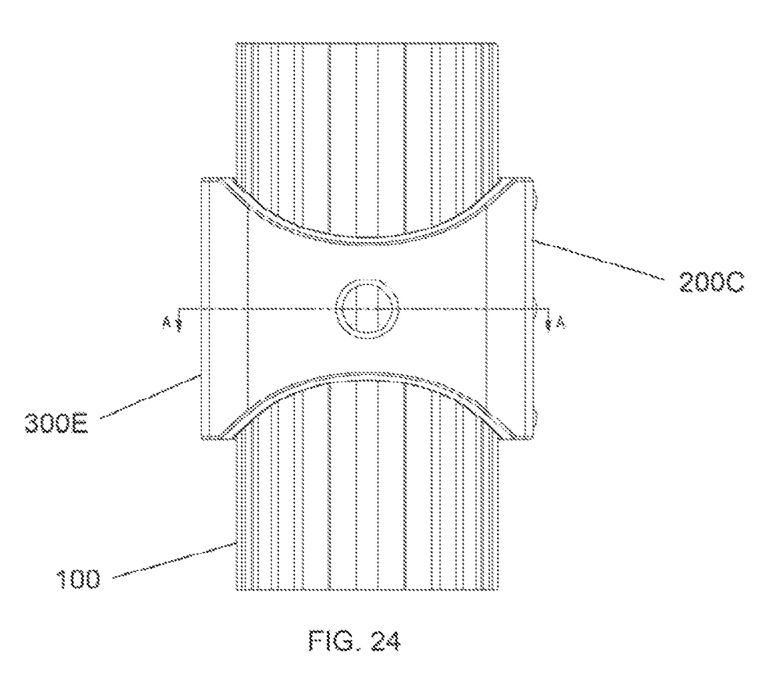
FIG. 24 illustrates a side view of a modified further embodiment of a pole assembly.
Figure 25:
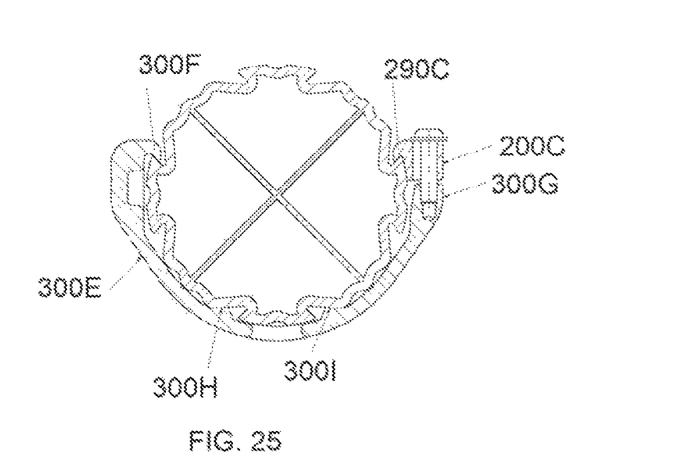
FIG. 25 illustrates a cutaway view of a modified further embodiment of a pole assembly.

FIGS. 24 and 25 illustrate a further modification of the embodiment of FIGS. 21-23. In this embodiment, only a single cam member 200C is used, and the mount portion 300E has a slotted arm 300F provided directly on a side opposite the mounting flange 300G which engages the cam member 200C. The single cam member 200C has a single slotted arm 290C along one of its sides for engagement with a dovetail of the tubular member, and through holes which extend through the widthwise direction of the cam member 200C. The mount portion 300E defines a concavity in which a portion of the tubular member 100 is to be disposed within. The slotted arm 300F of the mount portion 300E is configured for direct engagement with a dovetail of the tubular member 100. Furthermore, the cavity can include projections 300H and 300I which make an obtuse angle substantially matching the obtuse angle made by substantially flat sidewall portions of one of the pairs of grooves of the tubular member 100 corresponding to one of the dovetails.

The mounting flange 300G of the mount portion 300E has threaded holes which correspond to the through holes in the cam member 200C, and respective bolts B3 are provided to be disposed through a respective through-hole and threaded hole to attach the mounting flange 300G and cam member 200C and prevent relative rotation therebetween. When the bolts are tightened, the engagement between the slots of the mounting flange 300G of the mount portion 300E, and of the arm 290C of the cam member 200C, with opposing dovetails of the tubular member 100, of the cavity of the mount portion 300E with the outer periphery of the tubular member 100, and of the projections 300H and 300I with the substantially flat sidewall portions of an intervening dovetail, fixes the cam member 200C and the mount portion 300E in a longitudinal position on the tubular member 100.

Figure 26A:
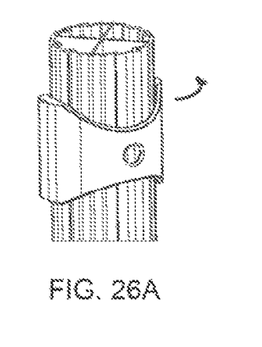
FIGS. 26A and 26B illustrate perspective and top views of a first step of installing a modified further embodiment of a pole assembly.
Figure 26B:
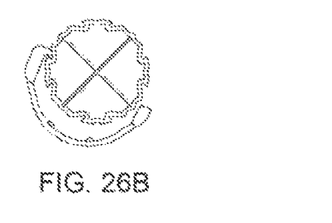
Figure 27A:
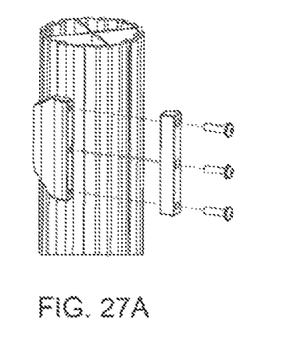
FIGS. 27A and 27B illustrate perspective and top views of a second step of installing a modified further embodiment of a pole assembly.
Figure 27B:
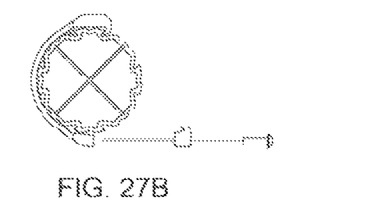
Figure 28:
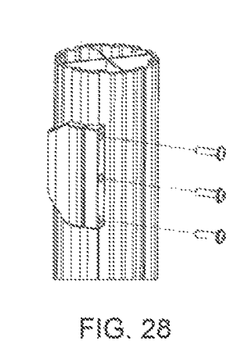
FIG. 28 illustrates a perspective view of a third step of installing a modified further embodiment of a pole assembly.
Figure 29:
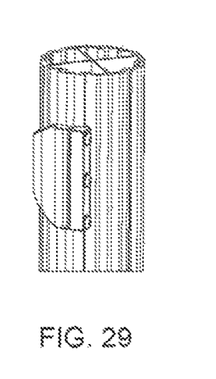
FIG. 29 illustrates a perspective view of a fourth step of installing a modified further embodiment of a pole assembly.

More specifically, as illustrated in FIGS. 26A and 26B, first, the slots of the mounting flange 300G of the mount portion 300E are engaged with a dovetail groove of the tubular member, and the mount portion 300E rotated in the direction of the arrow in FIG. 26A to reach the position illustrated in FIGS. 27A and 27B. Next, as illustrated in FIG. 28, the cam member 200C is engaged with the mounting flange 300G of the mount portion 200C, while the arm 290C of the cam member 200C is engaged with the opposite dovetail groove. Finally, as illustrated in FIG. 29, the bolts B3 are installed through the through-holes in the cam member 200C and screwed into the threaded holes of the mounting flange 300G.

The detailed description above describes features and aspects of embodiments of a pole assembly disclosed by way of example. The invention is not limited, however, to the precise embodiments and variations described. Changes, modifications and equivalents can be employed by one skilled in the art without departing from the spirit and scope of the invention as defined in the appended claims. It is expressly intended that all such changes, modifications and equivalents which fall within the scope of the claims are embraced by the claims.

What is claimed is:

1. A pole assembly comprising:
   an elongated tubular member having a longitudinal central axis and an outer periphery with a pair of grooves therein, each groove extending along the central axis and defining a concave sidewall portion and a substantially flat sidewall portion;
   a cam member comprising a plate-shaped portion and a pair of arms extending from a major surface of the plate-shaped portion, the cam member configured to, while the major surface is adjacent a portion of the outer periphery between the pair of grooves, be rotated to cause each arm of the pair of arms to engage a respective groove of the pair of grooves; and
   a mount portion comprising a body defining a cavity having a pair of elongated sidewalls configured to engage respective outer surfaces of the pair of arms while the mount portion covers the cam member and the cam member is at least partially within the cavity to prevent the pair of arms from disengaging from the pair of grooves.

2. The pole assembly of claim 1, wherein the mount portion includes a mounting hole configured for mounting of accessories thereto.

3. The pole assembly of claim 1, wherein the outer periphery of the elongated tubular member includes a plurality of the pairs of grooves therein.

4. The pole assembly of claim 1, wherein the pole assembly includes a plurality of the cam members and the mount portion is configured to cover the plurality of the cam members while the plurality of the cam members are at least partially within the cavity.

5. The pole assembly of claim 1, wherein the plate-shaped portion of the cam member includes a hole and the body of the mount portion includes a through hole, and the pole assembly further includes a bolt configured to be disposed through the through-hole and hole to attach the cam member and the mount portion.

6. The pole assembly of claim 5, wherein the plate-shaped portion of the cam member includes a second hole and the body of the mount portion includes a second through hole, and the pole assembly further includes a second bolt configured to be disposed through the second through-hole and second hole to prevent relative rotation between the cam member and the mount portion.

7. The pole assembly of claim 1, wherein an interior of the elongated tubular member is divided by at least one interior wall into at least two isolated axial chambers.

8. The pole assembly of claim 1, wherein the substantially flat sidewalls of the pair of grooves define an obtuse angle therebetween.

9. A pole assembly comprising:
   an elongated tubular member having a longitudinal central axis and an outer periphery with a pair of grooves therein, each groove extending along the central axis and defining a concave sidewall portion and a substantially flat sidewall portion;
   a pair of cam members, each cam member comprising a plate-shaped portion and an arm extending along a first side of a major surface of the plate-shaped portion, each cam member configured to be engaged by its arm with a respective groove of the pair of grooves; and
   a mount portion comprising a body defining a concavity and a pair of mounting flanges extending from opposite ends of the concavity, each mounting flange configured to be attached to a respective cam member of the pair of cam members at a second side of the cam member opposite the first side,
   wherein each of the pair of cam members include a through hole, each of the pair of mounting flanges includes a threaded hole, and the pole assembly further includes a pair of bolts configured to be disposed through a respective through-hole and threaded hole to attach the respective mounting flange and cam member.

10. The pole assembly of claim 9, wherein the mount portion includes a mounting hole configured for mounting of accessories thereto.

11. The pole assembly of claim 9, wherein the outer periphery of the elongated tubular member includes a plurality of the pairs of grooves therein.

12. The pole assembly of claim 9, wherein each of the pair of cam members include a second through hole, each of the pair of mounting flanges includes a second threaded hole, and the pole assembly further includes a second pair of bolts configured to be disposed through a respective second through-hole and second threaded hole to prevent relative rotation between the respective mounting flange and cam member.

13. The pole assembly of claim 9, wherein an interior of the elongated tubular member is divided by at least one interior wall into at least two isolated axial chambers.

14. A pole assembly comprising:
   a plurality of elongated tubular members, each elongated tubular member having a longitudinal central axis and an outer periphery with a pair of grooves therein, each groove extending along the central axis and defining a concave sidewall portion and a substantially flat sidewall portion;
   a cam member comprising a plate-shaped portion and a pair of arms extending from a major surface of the plate-shaped portion, the cam member configured to, while the major surface is adjacent a portion of the outer periphery between the pair of grooves of any of the plurality of elongated tubular members, be rotated to cause each arm of the pair of arms to engage a respective groove of the pair of grooves; and
   a mount portion comprising a body defining a cavity having a pair of elongated sidewalls configured to engage respective outer surfaces of the pair of arms while the mount portion covers the cam member and the cam member is at least partially within the cavity to prevent the pair of arms from disengaging from the pair of grooves,
   wherein each of the plurality of elongated tubular members has a different outermost diameter.

15. The pole assembly of claim 14, wherein the mount portion includes a mounting hole configured for mounting of accessories thereto.

16. The pole assembly of claim 14, wherein the pole assembly includes a plurality of the cam members and the mount portion is configured to cover the plurality of the cam members while the plurality of the cam members are at least partially within the cavity.

17. The pole assembly of claim 14, wherein the plate-shaped portion of the cam member includes a hole and the body of the mount portion includes a through hole, and the pole assembly further includes a bolt configured to be disposed through the through-hole and hole to attach the cam member and the mount portion.

18. The pole assembly of claim 17, wherein the plate-shaped portion of the cam member includes a second hole and the body of the mount portion includes a second through hole, and the pole assembly further includes a second bolt configured to be disposed through the second through-hole and second hole to prevent relative rotation between the cam member and the mount portion.

\* \* \* \* \*